United States Patent [19]
Trueblood et al.

[11] 3,863,623
[45] Feb. 4, 1975

[54] METHOD FOR MICROSCINTIGRAPHIC EVALUATION STUDIES

[75] Inventors: Jon H. Trueblood; Roger M. Rossomondo; William H. Carlton, all of Augusta, Ga.

[73] Assignee: Medical College of Georgia Foundation Inc., Augusta, Ga.

[22] Filed: June 19, 1972

[21] Appl. No.: 264,372

[52] U.S. Cl. .................. 128/2 A, 128/2 T, 250/303
[51] Int. Cl. .............................................. A61b 6/00
[58] Field of Search... 128/2 A, 2 T, 2.05 F, 2.05 R, 128/2.05 V; 250/363, 366, 369, 327, 303, 393

[56] References Cited
UNITED STATES PATENTS

| | | | |
|---|---|---|---|
| 2,776,377 | 1/1957 | Anger | 128/2 A X |
| 3,221,731 | 12/1965 | Annis et al. | 128/2.05 |
| 3,684,886 | 8/1972 | Muehllegner | 250/366 |

OTHER PUBLICATIONS

Yano, Y. et al., Journ. of Nuclear Med., Vol. 11, No. 11, November 1970, pp. 674–679.
Britton, K. E. et al., Brit. Journ. of Radiology, January 1969, Vol. 42, pp. 34–43.
Stern, H. S. et al., Nucleonics, Vol. 25, February 1967, pp. 62–68.

*Primary Examiner*—Kyle L. Howell
*Attorney, Agent, or Firm*—Schapp & Hatch

[57] ABSTRACT

A method for making microscintigraphic evaluation studies in small areas at or adjacent to the surface of the body, such as evaluation of the dynamics of lacrimal flow from the eye through the lacrimal sac and nasolacrimal duct, which comprises situating a drop of radioactive tracer liquid of calibrated minimal volume in the flow path upstream of the area to be evaluated and observing the passage of the radioactive tracer along the flow path by means of a micropinhole collimator and scintillation camera. The method permits study of the dynamics of the lacrimal drainage apparatus in vivo with the radioactive tracer delineating the canaliculi. The drop of tracer liquid contains between 50 and 100 microcuries of radioactive matter providing a specific activity level of from 4.4 to 8.0 mCi/ml. The drop of radioactive liquid is calibrated to an accurate volume of 1/80 of 1 cc by a screw advance syringe, and the drop is administered through a needle shielded against contact with the body. The gamma ray imaging camera receives its radiation input through a micropinhole collimator providing an optimum resolution of about 1 mm through an aperture of approximately 0.11 cm and a field having an included angle of about 80°.

16 Claims, 5 Drawing Figures

METHOD FOR MICROSCINTIGRAPHIC EVALUATION STUDIES

BACKGROUND OF THE INVENTION

This invention relates to a METHOD FOR MICROSCINTIGRAPHIC EVALUATION STUDIES, and more particularly to microscintigraphic evaluation of the flow of body fluids through defined flow paths at or adjacent to the surface, such as evaluation of lacrimal drainage from the eye.

Many methods have been used to determine the patency of the lacrimal drainage apparatus in man. The most widely used qualitative test is a simple test utilizing flurescein dye. However, it does not differentiate between the inferior and superior canaliculi and does not localize partial obstructions. Furthermore, the complete test requires catheterization of the canaliculi. Others describe a pressure transducer technique to measure and localize obstruction, but this procedure is involved and also requires catheterization.

Radiopaque dye studies of the nasolacrimal system (dacryocystogram) have been widely used for approximately 20 years. This test, however, requires several X-rays of the area and also catheterization of the canaliculi. The radiopaque dye is injected under pressure, possibly opening physiologic obstructions leading to false interpretation. This procedure is moderately uncomfortable and time consuming and distorts the true physiology.

The fluorescein dye test is exceedingly inaccurate and does not provide any quantitative measurement of the problem of epiphora. In addition it does not locate any point of obstruction in the lacrimal drainage system. Dacryocystograms are performed by injecting a radiopaque dye under pressure through the canaliculi. This procedure is non-physiologic and functional closures of the lacrimal drainage system may be temporarily opened during the pressure injection.

SUMMARY OF THE INVENTION

The present invention provides a method of evaluating in vivo the dynamics of body systems such as the lacrimal drainage apparatus in man. The procedure utilizes a minute quantity of radioactive tracer delivered as an eye drop. The progression of the radioactive tear is followed through the drainage system using a gamma ray imaging camera. The patient is permitted to blink freely and naturally. This method involves no catheterization and no discomfort. There is no sampling from the cul de sac and no cotton swabs up the nose. The radiation dose to the eye is small.

Existing gamma camera pinhole collimators are satisfactory for scintigraphic evaluation of major organs and body structures. However, the resolution of the existing gamma camera pinhole collimator is not sufficient to delineate the structure of relatively small body passages and flow paths at or near the surface, such as are encountered in the lacrimal drainage system. The micropinhole collimator of the present invention enables the user to increase the optimum resolution from the previously available approximately 4.5 mm to approximately 1 mm. This makes possible the radioactive tracer evaluation of such tiny systems as the lacrimal drainage apparatus. In particular, as applied to lacrimal drainage evaluation studies, obstructions which cause epiphora are more easily diagnosed by the present method than by previously known procedures.

The micropinhole collimator of the present invention is generally in the form of a truncated cone having the micropinhole aperture at the small end of the cone so as to permit its location at close distances, such as about one-half centimeter from the surface of the body in the area to be studied, while still providing access to that area. The size of the aperture is calculated to provide an optimal spatial resolution commensurate with obtaining a statistically significant count rate.

Deposit of the requisite precisely calibrated, tiny drop of liquid containing radioactive tracer at the desired location in the eye is accomplished by a syringe device capable of ejecting the liquid drop in an accurate volume by means of a screw advance for the syringe plunger. The drop of radioactive liquid is administered through a needle shielded against contact with the body of the patient.

The gamma ray imaging camera takes a series of scintiphotos as the radioactive tracer is washed along the normal flow path, e.g., in the case of lacrimal drainage evaluation, the radioactive tracer is washed into the inner corner of the eye, through the puncta and into the canaliculi. Precise anatomical orientation and definition is obtained during the progress of the radioactive tracer through the defined flow paths by means of a radioactive pointer-marker, which can be used at any state of the procedure. The pointer-marker is positioned over selected physiological features and offers a precise reference in the statistical scinti-image.

It is therefore an object of the present invention to provide a method for microscintigraphic evaluation studies in which the dynamics of the flow of body fluids through relatively small flow paths at or adjacent to the body surface may be studied in vivo with a radioactive tracer.

Another object of the present invention is to provide a method of the character described utilizing a gamma ray imaging camera and speciality developed micropinhole collimator to provide improved resolution of the scinti-image sufficient to permit in vivo studies of the flow of body liquids through relatively tiny body passages.

A further object of the present invention is to provide a method for in vivo studies of the dynamics of the lacrimal drainage apparatus in man which provides a much lower dosage of radiation and a more physiologic nature of demonstrating the lacrimal apparatus than has been obtainable with known techniques involving radiopaque dye studies.

Another object of the present invention is to provide a method for accomplishing lacrimal drainage evaluation without requiring catheterization, application of pressure or other uncomfortable and physiologically distorting procedures.

Further objects and features of advantage will become apparent as the specification progresses.

DESCRIPTION OF THE DRAWINGS

A preferred embodiment of the invention is shown in the accompanying drawings, in which.

Figure 1:
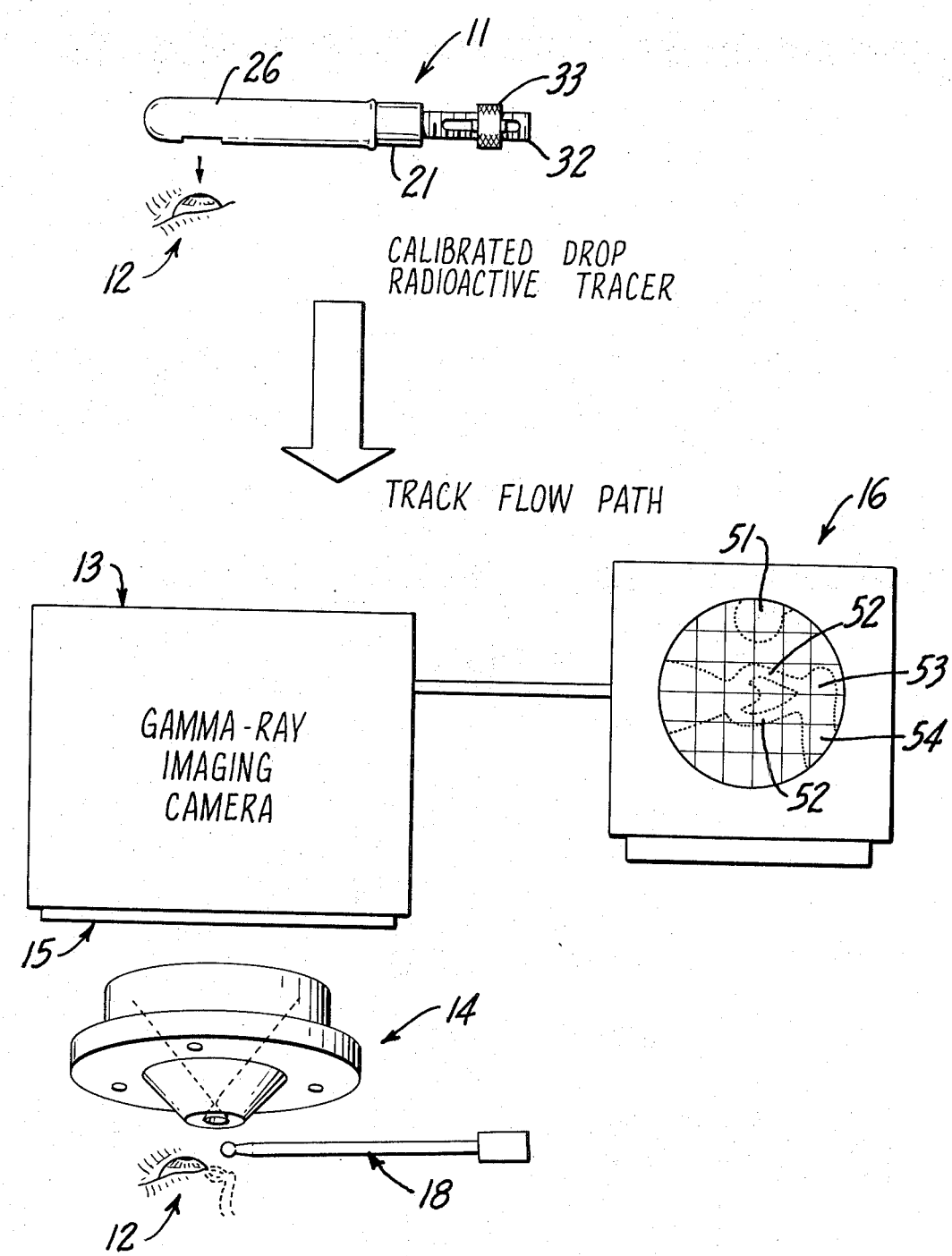
FIG. 1 is a schematic flow diagram illustrating a method of the present invention.

While only the preferred embodiment of the invention has been illustrated in the drawings, it will be apparent that other modifications and forms of the invention may be made within the ambit of the claims.

DESCRIPTION OF THE PREFERRED EMBODIMENT

The method of the present invention basically includes the steps of situating a drop of radioactive liquid of calibrated minimal volume in the flow path of body fluid upstream of the area to be evaluated, positioning a micropinhole collimator with the area to be evaluated in its operative field, passing radiation emitted from the drop of radioactive liquid through the micropinhole collimator onto the receptor of a gamma ray imaging camera to provide a visual display of sufficient resolution to delineate successive positions of said radioactive liquid in said flow path, and observing in the visual display the passage of the drop of radioactive liquid being carried along the flow path in order to determine the physical characteristics of the system.

The method of the present invention is particularly adapted for studying, in vivo, lacrimal drainage dynamics. Other clinical applications for this procedure may include microscintigraphic of the salivary glands, or any other portion of the body which is relatively small, that is, any organ or area which has a diameter less than approximately one inch and which is located at or near the surface. There is a possibility of looking at circulation time for a bolus of radioactive material in some area of the body such as the gums, or an extremity such as a finger or a toe. Skin grafts could be studied to determine the rate of growth. Another promising application of the present method is small animal imaging for research involving new radioactive materials and labeled compounds. Moreover, the present method may be used to conduct tear half-life studies of eye drop vehicles and the influence of contact lens on lacrimation.

In accordance with the present invention, the radioactive tracer solution is designed to provide a minimal quantity of radioactive material to be introduced into the eye, and it has been found that a solution of technetium pertechnetate (Tc-99m) provides certain advantages in the present invention. Tc-99m is a relatively inexpensive radioactive material which is available in almost all nuclear medicine facilities. It has a relatively low energy gamma with a high efficiency of interaction in the sodium iodide crystal and is a relatively low dose radioisotope since it does not emit a beta particle. It is prepared in a normal, sterile, pyrogen-free, buffered saline solution ideal for introduction into the eye, and has a relatively short half-life of only 6 hours.

The concentration of Tc-99m in the solution is such that the drop administered contains between 50 and 100 microcuries of Tc-99m to provide a specific activity from about 4.4 to 8.0 mCi/ml. Tc-99m, in addition to ready availability, has a relatively low energy gamma (140 keV), a relatively short half-life (6 hours) and lack of any particulate radiation which would increase the radiation dose to the eye. The dose to the lens of the eye is approximately 4 millirads if a tear half-time of 1 minute is assumed. This may be compared with a dose of 370 millirads for a single typical AP roentgenogram.

In conducting the microscintigraphic evaluation of the lacrimal drainage system, the drop of radioactive tracer solution is situated in the eye, preferably at about the center of the cornea. As illustrated in FIG. 1 of the drawings, the drop of radioactive tracer solution is precisely measured in a syringe device 11 and is ejected to therefrom into the eye 12 being studied. The normal flow of lacrimal fluid rapidly moves the tracer from the area of contact on the cornea to the area of the puncta and into the canaliculi. A small quantity of tracer collects over the medial canthus and the palpebral fissure is outlined. Radioisotope quickly collects in the nasolacrimal sac and proceeds down the nasolacrimal duct somewhat more slowly.

The eye 12 being studied is then positioned before a gamma ray imaging camera 13 with the tip of a specially designed micropinhole collimator 14 approximately one-half centimeter from the inner canthus of the eye. The collimator 14 is designed to provide access to the eye and sufficient resolution to delineate the canaliculi.

The gamma ray imaging camera, also known as a scintillation camera and as the "Gamma Camera," has been widely used for several years. These cameras make a statistical count of gamma radiation and utilize this information in a signal to a cathode ray tube to create a visual image in accordance with the concentrations of gamma ray emissions striking the receptor area 15 of the camera. These scintillation cameras are commercially available. For example, a suitable scintillation camera for practicing the present invention is known as the Pho-Gamma Scintillation Camera and is manufactured by Nuclear Chicago Corporation, 2000 Nuclear Drive, Des Plaines, Ill., 60018.

The smallest heretofore commercially available collimator has an aperture of 0.177 inches and is incapable of resolving the small passages such as the lacrimal canaliculi. The tapered micropinhole collimator constructed in accordance with the present invention has an aperture of 0.11 ± .005-.01 cm and permits close juxtapositioning of the object and the pinhole, and effective anatomic viewing of the upper lacrimal system. Additional views of the system result in three dimensional appreciation of the anatomy. More views do not necessitate more radiation exposure, as is the case with ordinary roentgenograms.

In conducting the method of the present invention, it is preferred to make a series of successive scintiphotos from the face of the cathode ray tube display at timed intervals over about a 25 minute period. This permits recordation and subsequent comparison of the succession of scintiphotos to determine certain physiological characteristics. By way of example, one value of the diagnostic procedure provided by the present method is shown by an interesting finding. Very little radioactivity was consistently found in the last 2-3 mm of the canaliculi entering the lacrimal sac. This finding suggests that this portion of the drainage system is functionally closed most of the time. Since the tracer material clearly traverses this apparently closed section, the tracer must travel through this area very quickly. It has been suggested that the "lacrimal pump apparatus" in blinking partially pumps the lacrimal drainage into the sac. This pumping action may open that part of the canaliculi briefly and rapidly pass the tracer into the sac.

Because of the excellent natural physiological character of the present method and procedure, it should be a useful tool to study in vivo lacrimal drainage dynamics. All of the subjects tested agreed that the procedure is non-irritating. All subjects specifically denied any increase in natural lacrimation. The physiology and anatomy not being greatly altered, the present method and procedure provides a superior technique for studying the dynamics of the drainage apparatus.

Problems exist in accomplishing the safe administration of a radioactive material drop to the eye. Firstly, the radioactive material drop has to be calibrated precisely according to volume. Secondly, this drop must be administered with no danger of physical mechanical harm to the eye. Thirdly, the radioactive material must be handled in an efficient and safe manner by the clinician or technician. The safest method for transferring radioactive material in the clinical laboratory involves the use of a syringe, needle and sealed vial. The calibration of the quantity of the radioactive material in a sealed vial is a common procedure in the nuclear medicine laboratory, and the withdrawal into a syringe of a certain quantity of radioactive material is likewise common procedure. Accurate volumetric control and calibration of the drop is here accomplished by providing a screw advance mechanism 17.

Figure 2:
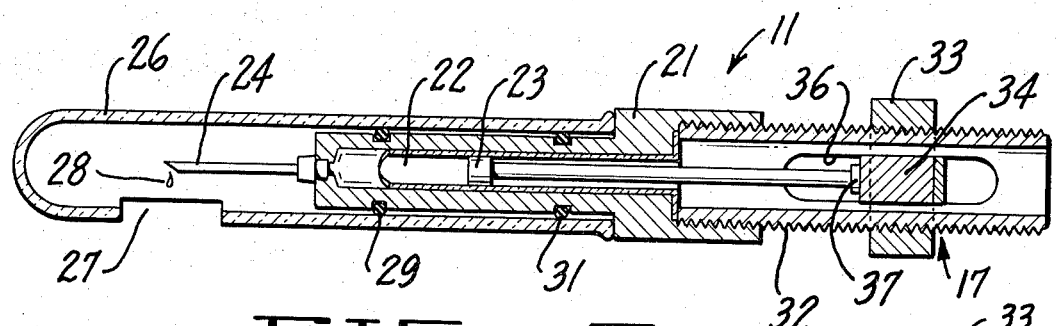
FIG. 2 is a longitudinal cross-sectional view through a syringe device constructed in accordance with the present invention.
Figure 3:
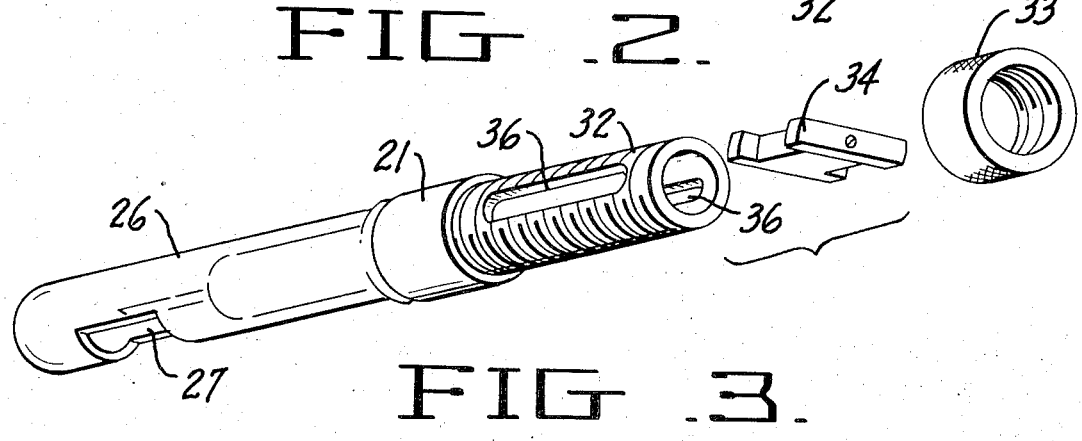
FIG. 3 is an exploded perspective view of the syringe device of FIG. 2.

As may best be seen in FIGS. 2 and 3 of the drawings, the syringe device 11 includes a body portion 21 formed to provide an axially extending reservoir 22 in which a plunger 23 is reciprocally mounted for ejecting the contents of reservoir 22 through a hollow needle 24. Conveniently, a conventional 1 cc tuberculin syringe with a 21 gauge needle may be utilized, it having been found that approximately 1 cc corresponds to 80 aqueous drops of the size desired. The supply of liquid radioactive tracer material is drawn into reservoir 22 through needle 24 in the conventional way by retracting plunger 23 while needle 24 is inserted through the usual closure into the sealed vial. Preferably, the body portion 21, or at least the part surrounding reservoir 22 is all or part lead for shielding purposes.

Safe mechanical administration of the drop to the eye is accomplished by enclosing the needle 24 of the syringe in a suitable cover 26 having a port 27 formed therein through which the drop 28 of radioactive tracer fluid can fall into the eye 12. Conveniently, and as here shown, the cover 26 may be provided by a plastic test tube having a window cut therein to provide port 27 and removably secured to syringe body portion 21 by engagement over O-rings 29 and 31.

The screw advance mechanism 17 is here provided by a tubular member 32 extending axially from syringe body portion 21. A manually engageable sleeve member 33 is threaded on tubular extension 32 and is operatively connected to a bifurcated follower 34 slidably engaged in axially extending slots 36 formed in member 32. when ring 33 is rotated, its axial movement is imparted to follower 34 which, in turn, bears against the distal end 37 of plunger 23 for displacing the plunger into reservoir 22 by a precisely measurable distance to eject a calibrated drop 28 of precisely measured volume from the end of needle 24.

Figure 4:
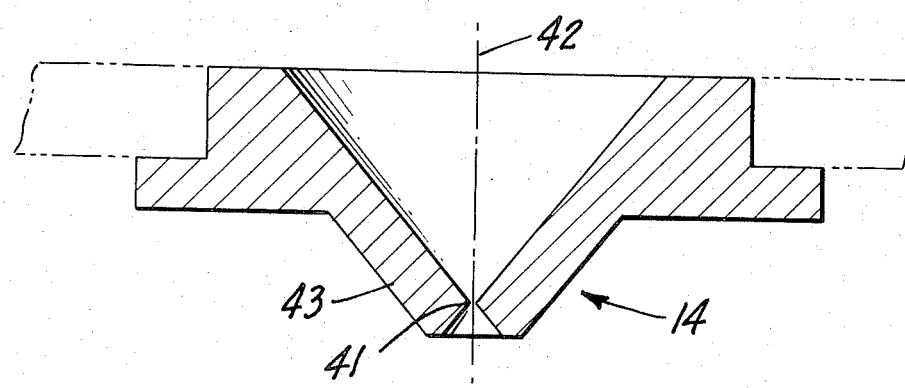
FIG. 4 is a cross-sectional view taken on the central axis of a micropinhole collimator forming part of the apparatus of the present invention.

As may best be seen in FIG. 4 of the drawings, the micropinhole collimator 14 is in the form of a tapered, truncated lead cone to permit placement of the micropinhole aperture 41 in close proximity to the eye without interfering with access to the area under observation, thus permitting use of the radioactive pointer-marker 18. The collimator 14 is relieved adjacent to micropinhole aperture 41 by an amount sufficient to provide an operative field including the desired area of eye 12 and to pass and resolve gamma radiation therefrom onto the receptor 15 of the gamma ray imaging camera 13 in a manner providing the desired scinti-view of the lacrimal drainage apparatus. As here shown, the included angle between the axis 42 of the frustoconical portion 43 and the inner surface of the relieved portion is approximately 40°, making an included angle of the relieved portion of approximately 80°.

In microscintigraphy, the problem of anatomical orientation and definition can be obscured by the statistical scinti-image. The radioactive pointer-marker 18 serves to aid the clinician in determining precisely various anatomical orientations and definitions. For example, the radioactive material at the tip of the pointer-marker shows up on the screen of the cathode display tube 16 as a bright dot 51. This dot may be placed over any of the anatomical features of the subject and its spatial relation to the scinti-image provides accurate determination of the external anatomical features with respect to the internal features, such as the canaliculi 52, the lacrimal sac 53 and the nasolacrimal duct 54, being delineated in the scinti-image by the radiation emitted from the radioactive tracer as it progresses through the lacrimal drainage system.

Figure 5:
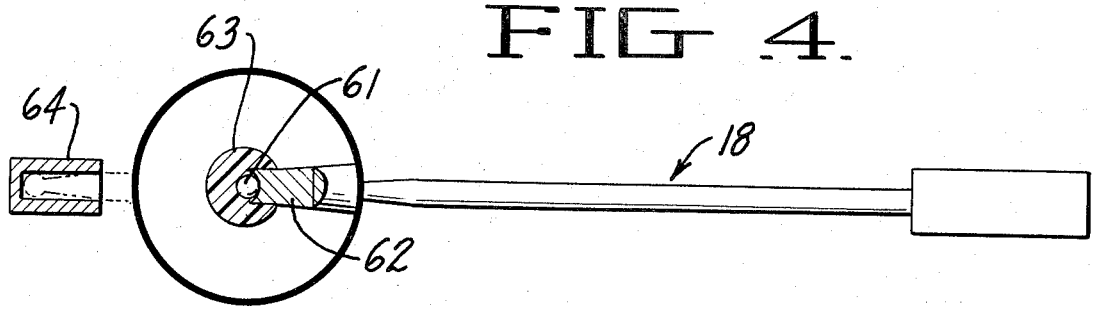
FIG. 5 is an exploded side elevational view of a radioactive pointer-marker forming part of the apparatus of the present invention, with portions thereof being shown in section and on an enlarged scale.

As may best be seen in FIG. 5 of the drawings, the pointer-marker 18 is here provided by depositing a small amount of radioactive material 61 on a tapered tip 62 of a ⅛ inch diameter brass rod. The radioactive material 61 is encapsulated in a protective envelope 63 of epoxy. This precaution is necessary because a relatively long-lived radioisotope is used. A protective removable lead cover 64 is provided for added protection of the radioactive tip when not in use.

Other marking procedures are commonly used in gamma camera imaging studies. The marker used in these procedures usually consists of a plastic disc containing radioactive material or a complex electronic marking system. While both of these marking methods may be satisfactory for large organ imaging, neither of them is satisfactory for use in microscintigraphy. On the other hand, the pointer-marker 18 of the present invention can be used in both large and small organ imaging.

Co-57 is preferred as the radioactive material for the pointer-marker 18. The 122 keV principal gamma ray energy of Co-57 is near enough in energy to the 140 keV gamma ray energy of Tc-99m to be processed by the gamma camera in the same manner. The 270 day half-life of Co-57 is sufficiently long to provide a reasonable service period. A longer lived radioisotope may be economically advantageous for the user, but also would be more hazardous.

From the foregoing, it will be seen that the method and apparatus for conducting microscintigraphy studies disclosed herein provides in vivo examination of relatively small areas of the body, at or near the surface, without impeding or otherwise interfering with the normal physiological function, providing an accurate and meaningful diagnosis with minimal patient discomfort and minimal exposure to radioactivity.

We claim:

1. The method of microscintigraphic evaluation of the flow of the body fluids through defined flow paths adjacent to the surface of the body, comprising situating a drop of radioactive liquid of calibrated minimal volume in the flow path upstream of the area to be evaluated, positioning a micropinhole collimator in close proximity to said area and with said area in its operative field, passing radiation emitted from said drop of radioactive liquid at said area through said micropinhole collimator onto the receptor of a gamma ray imaging camera to provide a visual display of sufficient resolution to delineate successive positions of said radioactive liquid in said flow path, and observing in said visual display passage of said drop of radioactive liquid being carried along said flow path within said area to determine physical characteristics thereof.

2. The method as described in claim 1 and wherein said radioactive liquid is a solution containing material emitting gamma radiation only.

3. The method as described in claim 2 and wherein said drop of radioactive liquid contains between about 50 and about 100 microcuries of radioactive matter providing a specific activity level of from about 4.4 to about 8.0 mCi/ml.

4. The method as described in claim 1 and wherein said drop of radioactive liquid is applied by using a screw advance syringe calibrated to an accurate volume and is administered through a needle shielded against contact with the body.

5. A method as described in claim 1 and wherein said micropinhole collimator provides an optimum resolution of about 1 mm.

6. The method as described in claim 5 and wherein said micropinhole collimator has an aperture of about 0.11 −.005 +.01 cm.

7. The method as described in claim 6 and wherein said micropinhole collimator provides a field having an included angle of about 80°.

8. The method of microscintigraphic evaluation of lacrimal drainage in vivo, comprising situating a drop of radioactive liquid of calibrated minimal volume in the eye at about the center of the cornea, positioning a micropinhole collimator about one-half centimeter from the inner canthus of the eye with the lacrimal sac and nasolacrimal duct in the field of said collimator, passing radiation emitted from said radioactive liquid through said micropinhole collimator onto the receptor of a gamma ray imaging camera, and making a plurality of successive scintiphotos from said gamma ray imaging camera over about a 25 minute period.

9. The method as described in claim 8 and wherein said radioactive liquid is a solution of Technetium Pertechnetate containing Tc-99m.

10. The method as described in claim 8 and wherein said drop of radioactive liquid contains between about 50 and 100 microcuries of radioactive material providing a specific activity of from about 4.4 to about 8.0 mCi/ml.

11. The method as described in claim 10 and wherein said radioactive material has a gamma of less than about 150 keV and a half-life of less than about 7 hours.

12. The method as described in claim 11 and wherein the size of said drop of radioactive liquid adminstered is about one-eightieth of 1 cc in volume.

13. The method as described in claim 12 and wherein said drop of radioactive liquid is administered in an amount sufficient to provide a dose to the lens of the eye of about 4 millirads at an assumed tear half time of 1 minute.

14. The method as described in claim 8 and wherein an elongated pointer-marker having a radioactive tip is positioned in the field of said collimator to locate physiological features in said scintiphotos.

15. The method as described in claim 14 and wherein the gamma ray energy of said tip is sufficiently similar to the gamma ray energy of said radioactive liquid to be processed in the same way by said gamma ray imaging camera.

16. The method as described in claim 15 and wherein said radioactive liquid contains Tc-99m and said radioactive tip comprises Co-57 encapsulated in a protective envelope.

* * * * *